(12) United States Patent
Mitsch (10) Patent No.: US 9,816,552 B2
(45) Date of Patent: *Nov. 14, 2017

(54) BUSHING WHICH CAN BE PRETENSIONED BY MATERIAL DISPLACEMENT AND BEARING EQUIPPED WITH SAID BUSHING

(71) Applicant: FM ENERGIE GMBH & CO. KG, Heppenheim (DE)

(72) Inventor: Franz Mitsch, Heppenheim (DE)

(73) Assignee: FM ENERGIE GMBH & CO. KG, Heppenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,287

(22) Filed: Feb. 11, 2016

(65) Prior Publication Data

US 2016/0160915 A1    Jun. 9, 2016

Related U.S. Application Data

(62) Division of application No. 14/000,978, filed as application No. PCT/EP2012/000971 on Mar. 5, 2012, now Pat. No. 9,284,975.

(30) Foreign Application Priority Data

Mar. 9, 2011   (EP) .................................... 11001935

(51) Int. Cl.
*F16F 1/38* (2006.01)
*F16C 27/06* (2006.01)
(Continued)

(52) U.S. Cl.
CPC ............ *F16C 27/063* (2013.01); *F16C 17/02* (2013.01); *F16F 1/387* (2013.01); *F16F 1/3835* (2013.01);
(Continued)

(58) Field of Classification Search
CPC .. F16F 17/02; F16F 1/38; F16F 1/3842; F16F 1/3835; F16F 1/387; F16F 1/3876;
(Continued)

(56) References Cited

U.S. PATENT DOCUMENTS 2,414,743 A    1/1947   Kaemmerling
4,619,544 A    10/1986  Laidely
(Continued)

FOREIGN PATENT DOCUMENTS

DE    10 2006 030 967 A1    1/2008
DE    10 2006 031 348 A1    1/2008
(Continued)

OTHER PUBLICATIONS

International Search Report Corresponding to PCT/EP2012/000971 dated Jul. 5, 2012.

*Primary Examiner* — Thomas Irvin
(74) *Attorney, Agent, or Firm* — Davis & Bujold PLLC; Michael J. Bujold (57) ABSTRACT

An elastomeric bushing for a bearing. The bushing can, even after installation in the bearing, be pretensioned or calibrated, by displacement of elastomeric material in the interior of the bushing, where the displacement is carried out by different pressing mechanism and tensioning mechanism in the bushing and/or in the surrounding bearing.

20 Claims, 7 Drawing Sheets

(51) Int. Cl.
*F16F 1/387* (2006.01)
*F16C 17/02* (2006.01)
*F16F 1/393* (2006.01)

(52) U.S. Cl.
CPC .... *F16F 1/3842* (2013.01); *B60G 2204/4106* (2013.01); *B60G 2204/4108* (2013.01); *F16F 1/38* (2013.01); *F16F 1/3876* (2013.01); *F16F 1/393* (2013.01)

(58) Field of Classification Search
CPC ......... F16F 1/393; F16C 27/063; F16C 17/02; B60G 2204/4106; B60G 2204/4108
USPC ... 267/140, 140.2, 140.4, 140.5, 141.2, 292, 267/293; 248/621
See application file for complete search history.

(56) References Cited

U.S. PATENT DOCUMENTS

| | | | |
|---|---|---|---|
| 4,913,411 A | 4/1990 | Collins et al. | |
| 6,274,211 B1 | 8/2001 | Detzner | |
| 6,547,207 B1 * | 4/2003 | Thompson | F16F 1/38 248/609 |
| 6,672,768 B2 | 1/2004 | Börsch et al. | |
| 6,802,497 B2 | 10/2004 | Hettler | |
| 7,063,310 B2 * | 6/2006 | Power | F16F 1/387 267/140.12 |
| 7,204,479 B2 * | 4/2007 | Power | F16F 1/387 267/140.12 |
| 7,464,919 B2 | 12/2008 | Hermann et al. | |
| 8,210,507 B2 | 7/2012 | Mitsch | |
| 8,746,663 B2 | 6/2014 | Mitsch | |
| 8,998,188 B2 | 4/2015 | Mitsch | |
| 9,284,975 B2 * | 3/2016 | Mitsch | F16F 1/3842 |
| 9,291,190 B2 * | 3/2016 | Kammerer | F16B 43/00 |
| 2003/0001323 A1 | 1/2003 | Hettler | |
| 2004/0108639 A1 | 6/2004 | Kato et al. | |
| 2007/0085253 A1 | 4/2007 | Franke et al. | |
| 2007/0290425 A1 | 12/2007 | Heuer et al. | |
| 2008/0308980 A1 | 12/2008 | Mitsch | |
| 2011/0018181 A1 | 1/2011 | Mitsch | |
| 2012/0292840 A1 | 11/2012 | Mitsch | |
| 2014/0196999 A1 | 7/2014 | Mitsch et al. | |
| 2015/0176671 A1 | 6/2015 | Mitsch | |
| 2015/0176672 A1 * | 6/2015 | Rehwald | F02M 55/025 123/470 |

FOREIGN PATENT DOCUMENTS

| | | |
|---|---|---|
| DE | 10 2008 007 092 A1 | 8/2009 |
| WO | 2007/042934 A1 | 4/2007 |
| WO | 2009/121552 A1 | 10/2009 |

* cited by examiner

BUSHING WHICH CAN BE PRETENSIONED BY MATERIAL DISPLACEMENT AND BEARING EQUIPPED WITH SAID BUSHING

This application is a divisional of U.S. patent application Ser. No. 14/000,978 filed Aug. 22, 2013, which is a National Stage completion of PCT/EP2012/000971 filed Mar. 5, 2012, which claims priority from European patent application serial no. 11 001 935.3 filed Mar. 9, 2011.

FIELD OF THE INVENTION

The invention relates to a bushing and a bearing which is equipped with the bushing in question. The bushing according to the invention can, even after installation in the bearing, be pretensioned, or calibrated, by displacement of elastomeric material in the interior of the bushing, where the displacement is carried out by different pressing means and tensioning means in the bushing and/or in the surrounding bearing. The elastomeric bushing is designed in such a way that the displacement of the elastomeric material from the interior of the bushing deforms and pretensions the latter and thus tensions it against the bearing eye. The pretension can be regulated here and is reversible over a relatively large range.

BACKGROUND OF THE INVENTION

The problem generally exists in bearing bushings that they have to be calibrated. In general, the bushings, must, for assembly, be pressed into an eye or also pressed onto a bolt. For calibration, the outer ring of the bushing in accordance with the prior art is generally pressed through a hole, so that the external diameter of the bushing reduces and thus the elastomer located between the outer bushing and the inner bushing is pretensioned. Alternatively, a bolt is pressed through the inner sleeve of the bushing and the latter is worked up, so that this also compresses the elastomer in the bushing (calibration). In general, these measures are carried out before installation in the proposed bearing. In addition, these measures mean that fine adjustment can only be carried out with difficulty.

SUMMARY OF THE INVENTION

The invention essentially solves two problems: 1. calibration of the bushing and 2. pressing into a tube or pressing onto a bolt.

Due to the solution offered and described in greater detail below, the elastomer volume in the central region of the bushing, which only experiences slight deformation in the operational state of the bushing or on loading in the operational state, and can thus contribute little to the requisite pretensioning of the bushing, is increased by the spatial connection to a pressing region, likewise filled with elastic material, under the action of tensioning means. The bushing is thereby pretensioned and compressed. Due to the consequently greater pressure, the outer bushing deforms outward and, where appropriate, the inner bushing deforms inward, so that the component is tensioned in the installed state.

DETAILED DESCRIPTION OF THE INVENTION

The invention thus relates to a round elastomer bushing 16 which can be pretensioned and calibrated in the installed state, comprising a deformable outer sleeve 5 and a compact, inner part 4 which can be flanged, which are both connected to one another by an elastomer layer 1, where the bushing comprises an additional elastomer layer 2, 25 functioning as pressing region, which is connected to the elastomer layer 1 and is compressed by mechanical pressing or tensioning means 3, 4a, 5a, 8, 19, 21, 24, 12, 13, 7, 20, 21, 22 and/or hydraulic pressing or tensioning means 12, 13, 14, 17 so that the elastomer material forced out of the pressing region 2 and forced into the elastomer layer volume 1 compresses the elastomer layer 1, in order that the outer wall 5 of the bushing deforms radially outward, and thus effects tensioning of the bushing 16 with a surrounding component 10 connected to the bushing.

The elastomer material of the pressing region 2 is preferably of different hardness, preferably softer, compared with the elastomer material of the bushing itself.

The embodiments of the subject-matters according to the invention can be divided into three categories:

(i) embodiments in which elastomeric pressing region 2 represents a separate part of elastomer layer 1 and is thus arranged between outer sleeve 5 and inner part 4, where the stiffnesses of regions 1 and 2 may be different;

(ii) embodiments in which the elastomeric pressing region is accommodated in the interior of the inner part 4 and is connected to the elastomer region 1 of the bushing 16 by elastomeric channels; and (iii) embodiments in which the elastomeric pressing region is arranged in the surrounding component 10 connected to the bushing, and is likewise connected to the elastomer region 1 of the bushing 16 by elastomeric channels.

Embodiments in Category (I):

The invention relates to a pretensionable elastomer bushing in which the additional elastomer layer 2 functioning as pressing region occupies all or some of a region of the elastomer layer 1 between the outer wall 5 and the inner part 4 or 4a (FIGS. 1-6A, 9, 12-12B)

In particular, the invention relates to a corresponding elastomer bushing in which the compact inner part 4 which can be flanged is additionally surrounded by an inner sleeve 4a of the same shape, in which the inner part 4 fits precisely, and which, instead of the inner part 4, is connected to the elastomer 1 and the inner wall of the preferably cylindrical outer sleeve 5 of the elastomer bushing. In this solution, the compact inner part 4 may also be omitted entirely, in particular if the bearing part 10 cannot be connected to the bearing part 11 via the inner part 4, but instead in another manner. The inner part 4 is either a solid, preferably metal core, but may also be an elastomer core of high stiffness. The inner part 4 or the inner sleeve 4a generally have a cylindrical shape; however, they may also have any other appropriate shape.

In a customary and relatively simple embodiment of the invention, the pressing region, or the pressing volume 2 is formed by a part of the volume between the outer sleeve 5 and the inner sleeve 4a, or the surface of the inner part 4. As shown in FIGS. 1, 1A, 6, 6A and 9, this pressing region 2 can be arranged externally on the inner part 4 or the inner sleeve 4a. In the said embodiment, it is formed by a sliding sleeve 3 serving as pressing means and a stop 3a, where the sliding sleeve 3 partly surrounds the inner part 4 or the inner sleeve 4a, and can be moved axially along the latter by suitable tensioning means 7 by the compression distance 9 into the elastomer region 2. The stop 3a may be a separate part which is attached to or mounted on the inner part 4 or the inner sleeve 4a or is itself an integral part of the components 4, 5a.

Figure 9:
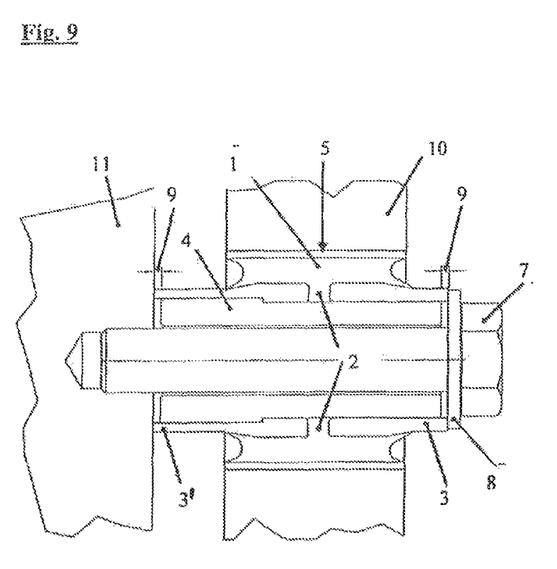
FIG. 9 shows the principle of the embodiment of FIG. 1.

As shown in FIG. 9, two sliding sleeves 3, 3' pushed onto the inner part 4 and axially movable relative to one another and between which the pressing volume 2 is located may also be employed. In this case, the stop 3a is superfluous.

However, the pressing region 2 may also or additionally be arranged on the opposite side on the inner wall of the outer sleeve 5. However, it may also fill the entire space between outer sleeve 5 and the inner part 4 or the inner sleeve 4a optionally surrounding the latter, in an annular manner, so that the elastomer volume 1 is divided into two regions by the preferably annular radial ring of the pressing region 2. In these variants (FIGS. 2-5) of the bushing according to the invention, the pressing region 2 may be compressed not only by the sliding sleeve 3 described, but also or additionally by a sliding sleeve 5a, which can be guided on the inner wall of the outer sleeve 5 and can be moved axially by tensioning means. The invention thus relates to a pretensionable elastomer bushing, in which the pressing means is a sliding sleeve 3 which partly surrounds the inner part 4 or the inner sleeve 4a and can be moved axially along the latter by the tensioning means 7 by the compression distance 9 into the elastomer region 2.

Figure 3:
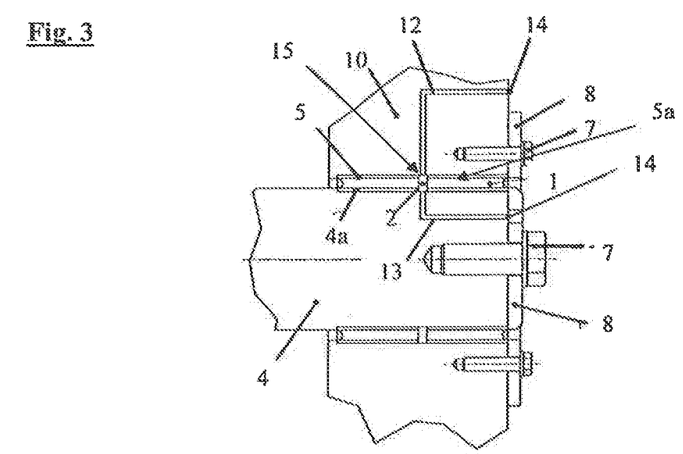
FIG. 3 shows a variant of the embodiment according to FIG. 2.
Figure 5:
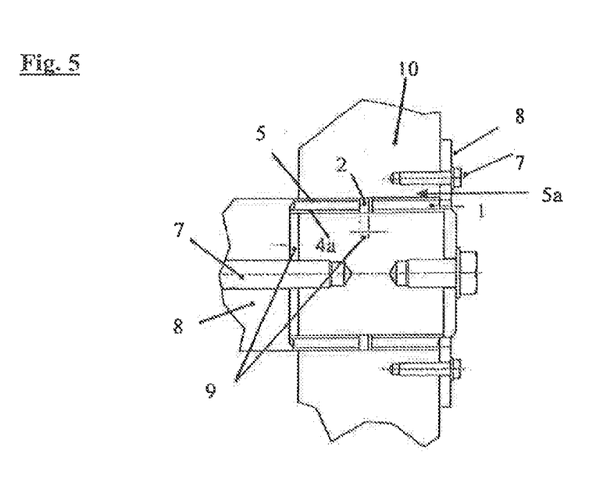
FIG. 5 corresponds the embodiment according to FIG. 2.
Figure 6:
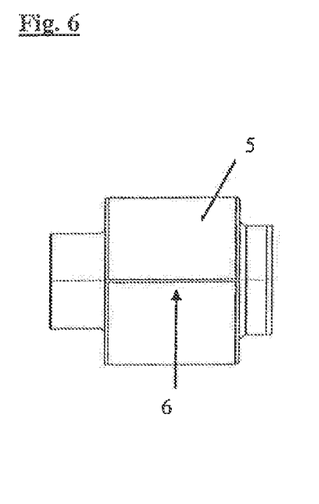
FIG. 6 is a diagrammatic side view of another embodiment of a bushing according to the invention.
Figure 6A:
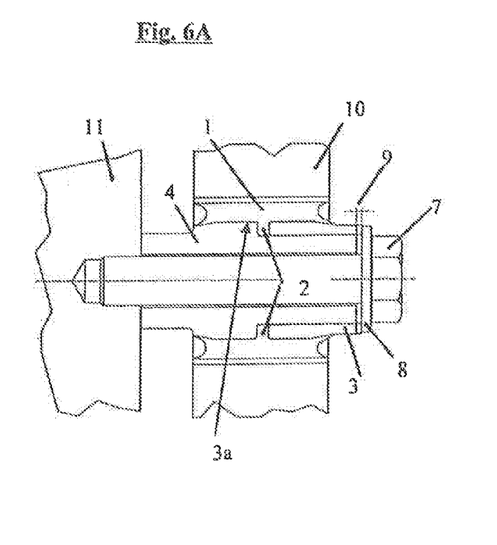
FIG. 6A is a diagrammatic sectional view of the bushing of FIG. 6.

Alternatively, the invention also relates to a pretensionable elastomer bushing in which the pressing means is a sliding sleeve 5a which can be moved axially along the inside of the outer sleeve 5 by the tensioning means 7 by the compression distance 9 into the elastomer region 2 (FIGS. 5, 6, 6A). In a refinement of this embodiment, the elastomer bushing according to the invention comprises two sliding sleeves 3 and 5a which are opposite one another in the radial direction and which can be moved along the inner part 4 or 4a and the inner wall of the outer sleeve 5 by tensioning means 7, in order to compress the adjacent pressing region 2 (FIGS. 3, 5). Finally, it is also possible to employ an elastomer bushing which has four sliding sleeves 3, 3' and 5a, 5a', where the sliding sleeves 3, 3' can be moved relative to one another, as can the sliding sleeves 5, 5' (FIG. 9).

Figure 2:
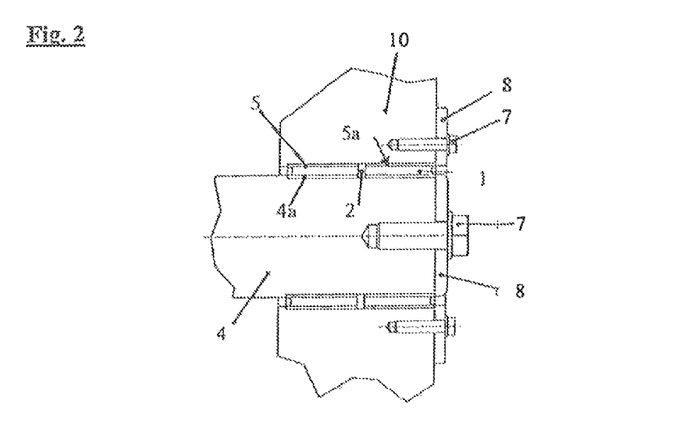
FIG. 2 shows a further design of a bushing according to the invention.

Another embodiment of the invention omits at least some of separate sliding sleeves 3, 3', 5a, 5a'. The compression of the pressing region 2 here takes place via the axial movement of the walls of the outer sleeve 5 and/or the inner sleeve 4a or the inner part 4 by tensioning means. To this end, for example, the wall of the outer sleeve 5 has an opening 15 in the shape of a ring or ring segment or a corresponding circumferential slot. This slot, or this opening 15, forms the pressing region 2 or at least part of the pressing region. As shown in FIGS. 2 and 3, the pressing region may also extend in the diameter of the said openings from the outer sleeve to the inner part or, if present, the inner sleeve, dividing the elastomer region 1 into two regions, but where all regions are connected to one another. The pressing means in this embodiment are thus the wall regions of the bushing 16 itself. In accordance with the invention, combinations of this embodiment with the embodiment which uses sliding sleeves can also be employed.

The invention thus relates to pretensionable elastomer bushing where the wall of the outer sleeve 5 has, in the region of the elastomer layer 2, a circumferential or partly circumferential opening 15, which is preferably completely filled by elastomer material and represents the elastomeric pressing region 2. The invention also relates to a corresponding bushing in which the wall of the inner sleeve 4a or the outer wall of the inner part 4 has, in the region of the elastomer layer 2, a circumferential or segmentary opening 15, which is preferably completely filled by elastomer material and represents the elastomeric pressing region 2, optionally together with the elastomer region of the opening 15 in the outer sleeve 5. In accordance with the invention, the pressing region 2 preferably additionally encompasses the elastomer volume in the region of the opening 15 between the outer sleeve 5 and the opposite inner part 4 or the inner sleeve 4a.

In a further particular embodiment of these bushings provided with openings 15, one or more of the openings 15 are connected to hydraulic tensioning or pressing means 12, 13, 14 or mechanical tensioning or pressing means 21, 22, by means of which the pretension of the elastomeric regions 1 and 2 can be adjusted and regulated before and during operation, optionally also additionally to the tensioning and pressing means already described. In particular, hydraulic pressure lines 12, 13 with pressure valves which force the hydraulic fluid against the elastomer layer 2 of the pressing region are here (FIG. 3).

In a particular embodiment, the pretensionable elastomer bushing according to the invention has a circumferential matching piston ring 21 or one or more piston ring segments 21 and one or more tensioning screws 22 or similar tensioning means, which are arranged radially in the bearing part 10 to be tensioned and with the aid of which the piston ring or the piston ring segments can be pressed into the openings 15 and thus compress or decompress the pressing region 2 and the elastomer region 1.

In the embodiments described in this category which have an opening 15 in the wall of the outer sleeve 5 and optionally in the inner sleeve 4a, the pressing region 2 may be restricted exclusively to the additional volume formed by the opening 15, if this volume comprises not less than 5-15% of the displacement volume of the elastomer layer 1. The pressing region 2 in these embodiments preferably encompasses the entire region between the outer sleeve 5 and the inner part 4 or, if present, the inner sleeve 4a, i.e. extends transversely over the thickness of the elastomer layer 1, which is interrupted by the pressing region 2, optionally with a different stiffness in the radial direction.

Embodiments in Category (ii):

In these embodiments of the invention, the elastomeric pressing region 2 is located in the interior of the compact inner part 4, as represented in FIGS. 10-10B and 13-13B. To this end, the inner part 4 has radial holes or channels 18 in preferably one plane which open out in the interior of part 4 in the pressing region 2. The holes or channels 18 are again filled with elastic material, preferably having lower stiffness than in the elastomer layer 1.

In a particular embodiment, the pressing means used is a piston 19, which is arranged in the middle or centrally in the inner part 4 and is forced axially into the pressing region 2 by tensioning means, for example a tensioning screw 7, and displaces elastomer material there through the channels 18 into the elastomer region 1. The invention therefore relates to pretensionable elastomer bushing in which the elastomer region 2 functioning as pressing volume is arranged in the interior of the inner part 4, which has at least one, preferably two to six, radial holes 18 filled with elastomeric material in a plane perpendicular to the axis of the bushing 16 which are connected to the centrally arranged elastomeric pressing region 2. When moved axially in the direction of the pressing region 2, the piston 19, which is arranged in the inner part 4 of the bushing, compresses (or decompresses) the elastomer material located in the pressing region and, via the holes 18, also the elastomer layer 1 of the bushing 16. This causes tensioning (or relaxation) of the bushing against component 10.

Embodiments in Category (iii):

In another embodiment, the pressing region 2 is located neither in the region of the elastomer layer 1 nor in the interior of the inner part 4 of the bushing, but instead outside the bushing in the region of the bearing part 10.

The invention thus relates to a pretensionable elastomer bushing in which the elastomeric pressing region 25, 26 is arranged outside the bushing 16 in the component 10 to be tensioned by means of the bushing, where it is connected to the elastomer layer 1 in the interior of the bushing by at least one channel 18 filled with elastomer material and a correspondingly shaped opening in the wall of the outer sleeve 5 and can be compressed by pressing and tensioning means 7, 19, 20, 24 which are arranged on the inner part 4 and/or the component 10.

Figures 11, 11B:
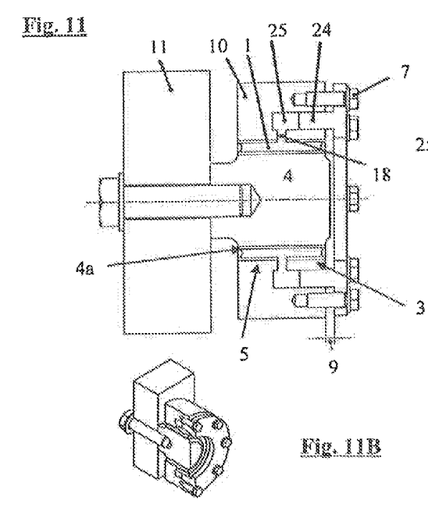
FIG. 11 is a sectional side view of an embodiment of a bushing with an outer pressing region.
FIG. 11B is an isometric sectional view of the embodiment of the bushing according to FIG. 11.
Figure 11A:
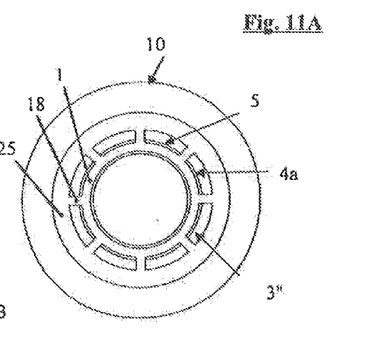
FIG. 11A is a diagrammatic front view of the embodiment of the bushing according to FIG. 11.

In a particular embodiment, the pressing region forms a round or differently shaped ring which is formed by a corresponding recess in the bearing part 10 and is run radially around the bushing 16 in preferably one plane. Alternatively, the pressing ring is not continuous, but is divided into individual circumferential ring segments. The elastomer material of the pressing ring 2 or of the individual segments is compressed by a piston ring 24 or piston ring segments, which can be moved axially by tensioning means 7 (FIGS. 11-11B). In this embodiment too, channels/holes 18 may be provided which connect the pressing region 2 to the elastomer layer 1, where a corresponding opening must be present in the outer sleeve of the bushing 16. The invention thus relates to a pretensionable elastomer bushing in which the elastomeric pressing region 25 surrounds the bushing 16 radially in full or in segments, and the circumferential pressing and tensioning means arranged in the same manner comprise a ring piston 24 or a segment of a ring piston, which is forced into the elastomer region 25 by the tensioning means 7.

Figures 14, 14B:
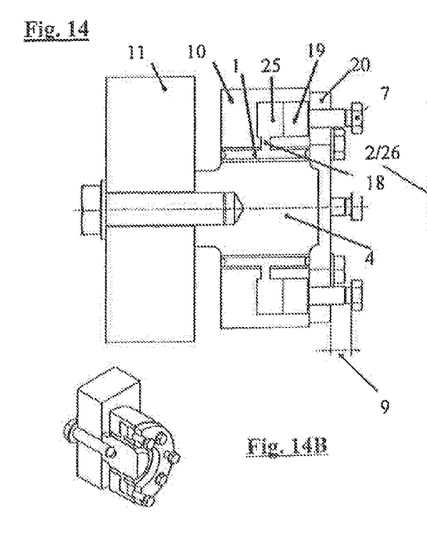
FIG. 14 is a diagrammatic sectional side view of an embodiment of a bushing similar to the embodiment of FIG. 12
FIG. 14B is an isometric sectional view of the embodiment of the bushing according to FIG. 14.
Figure 14A:
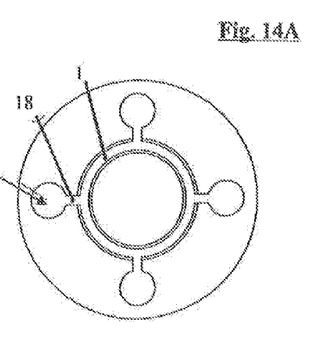
FIG. 14A is a diagrammatic front view of the embodiment of the bushing according to FIG. 14.

In a further embodiment, the circumferential or partly circumferential pressing region 2 can be replaced by individual holes or chambers 26, which are aligned axially and are arranged radially around the bushing 16 in the bearing component 10. The holes have piston elements 19 which can be moved axially by tensioning means 7 and are arranged directly above the respective pressing region 2. By moving the pistons, the elastic material can be compressed in each hole. The pressure generated is transmitted directly or via channels 18 to the elastomer layer between outer sleeve 5 and inner part 4, or inner sleeve 4a, by moving elastomer material. To this end, however, a correspondingly shaped opening must be present in the outer sleeve of the bushing (FIGS. 14-14B). The invention thus relates to a pretensionable elastomer bushing in which the elastomeric pressing region 25 in component 10 is formed by at least two axially arranged holes 26 in component 10 which are equipped with piston-shaped pressing means 19 and tensioning means 7, where the holes are arranged around the bushing 16, in which the pistons 19 move axially.

This arrangement also enables individual chambers 26 to be pressurized, so that the elastomer compression can occur not centrally, but instead eccentrically. Eccentric pretensioning of the bushings is thus possible. This has the following advantages: (i) in the case of an arrangement of a plurality of bushings on one component, tolerance problems can be compensated; (ii) in the case of a single-side load direction, it is possible to stiffen the bushing more in the load direction by asymmetrical application of pressure than in the other directions. This means a longer lifetime of the bushing.

For all embodiments described above, the following applies:

(1) The pressing region 2, 25 must in accordance with the invention be connected to the elastomer material 1 between the outer sleeve 5 and the inner sleeve 4a, or the inner core 4, so that elastic material can be forced out of the pressing region into the region of the elastomer material 1 between the inner and outer bushing, and the bushing is thus pretensioned. As described in greater detail below, the pressing region 2, 25 here may also be connected to the region of the elastomer material 1 by channels 18 filled with elastic material.

(2) The usual mechanical tensioning means 7 used in accordance with the invention are tensioning screws. However, other means having the same or a similar function can likewise be employed. The tensioning screws may also be replaced by active actuators, enabling the bushing stiffness to be changed, in particular during operation.

(3) The pressing region 2 should generally comprise 2-30% of the volume of the elastomer layer 1, preferably 5-20%, in particular 5-15%. This also corresponds approximately to the volume to be displaced. Since the volume of region 2 must flow radially into the elastomer volume of layer 1, the entire volume is not pressed out, but instead a layer with a thickness of 1-5 mm remains in pressing region 2.

(4) The crucial function in the case of the bushing according to the invention is, as already mentioned, to compress the elastomeric pressing region 2 by the pressing elements in such a way that it can be added to the elastomer volume 1. The pressure therein increases so that compression takes place over the entire elastomer length 1, where the pressure in the centre of the bushing is greater and drops off towards the edges.

Figures 1, 1A:
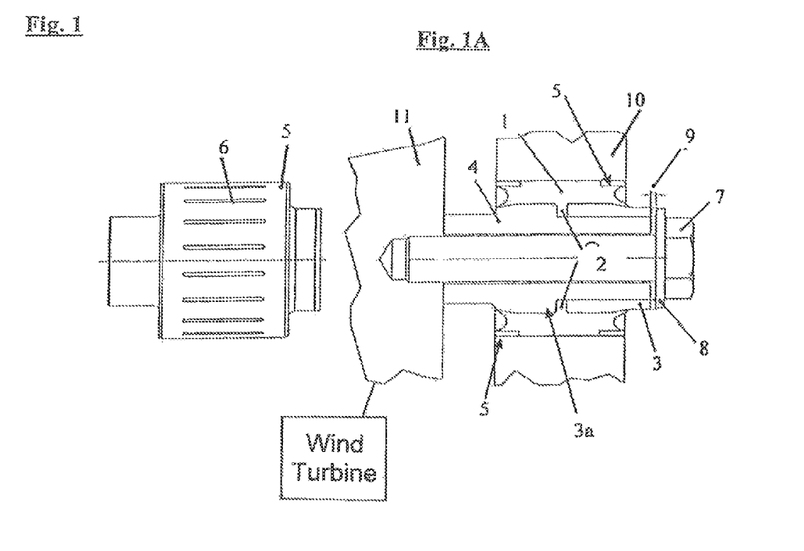
FIG. 1 is a diagrammatic side view of an embodiment of a bushing according to the invention.
FIG. 1A is a diagrammatic sectional view of the bushing of FIG. 1.

(5) In general, the bushing 16 according to the invention can have one or more longitudinal slots 6, which facilitate better radial deformation of the outer sleeve 5, even at relatively low pressure. These slots can, as represented in FIGS. 6 and 6A, run over the entire length of the outer sleeve 5 or, as represented in FIG. 1, only have a limited length. The non-continuous slots have the advantage, although they are more complex to produce, that the bushing is durable for longer, since the greatest elastomer movement takes place at the contour runout at the ends of the bushing, so that the greatest damage also occurs here. In the case of continuous slots, at least one slot is necessary. FIGS. 6 and 6A show the design with one slot, which facilitates preferably reversible bending-up of the outer part 5. In the case of embodiments having one slot or having two slots, the installation is carried out in such a manner that the load direction is on the sides of the continuous sheeting and no load introduction takes place in the weakened region of the slot(s). The slots thus do not have an adverse effect on the durability of the elements of the bushing. In the case of embodiments of the bushing 16 according to the invention which contain slots 6, the elastomer is also compressed in or between these slots and thus simultaneously improves the friction between the outer sleeve 5 and the bearing component 10, enabling greater loads to be transmitted in the axial direction.

Slots can be omitted if the material of the outer part 5 is selected to be sufficiently thin that reversible bending-up is readily possible even without slots. In general, however, such embodiments are less durable.

(6) The movement of the corresponding pressing means 3, 4a, 5a is generally carried out by pressing against the pretensioning disc 8 by means of the pretensioning screw 7. The pretensioning compression distance 9 is covered, and a defined volume is thus displaced out of region 2 into region 1. The bushing according to the invention is pushed into the component 10 to be supported and fixed in the component 10 to be supported by the expansion of the outer part 5. The compact inner part 4 can be a bolt of any shape, which, as shown in FIG. 1, can be flanged axially onto the flange side 11 of the component to be supported. The higher the bushing calibration or bushing pretension, i.e. the more elastic material is added between the outer part 5 and in the inner part 4, 4a of the bushing 16, the higher the radial stiffness of the entire bushing. Thus, in the case of the bushings and bearings according to the invention, stiffness variations can be equalized by the introduction of compensation discs 8 of different thickness which cause different pretensioning. The compact inner part 4 preferably has a round or oval cylindrical shape; however, it may also have a regular or irregular angular shape.

(7) Elastomer layer 1 comprises conventional synthetic or natural elastic materials which have moderate to relatively high stiffness. This ultimately depends on the technical area of application of the bushing, its size and the forces to which it is to be subjected. The stiffness of the elastomeric material employed in accordance with the invention in pressing regions 2, 25 and in the channels/holes is of at most the same, but preferably of lower stiffness. The stiffness of elastomer layer 1 which connects the outer and inner parts of the bushing to one another is 10-90%, preferably 10-50%, preferably 15-40%, higher than the elastomeric material in the pressing region 2, 25 or the channels and holes which can be assigned to the pressing region.

Figure 7:
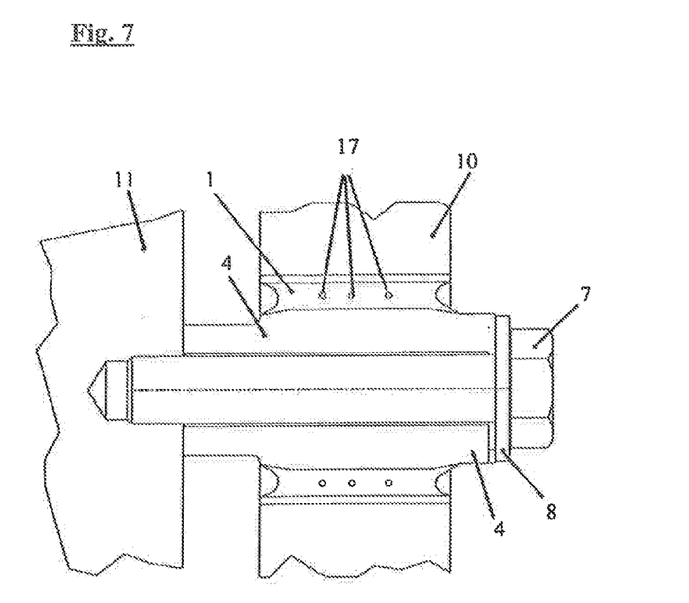
FIG. 7 shows an embodiment of an elastomeric bushing with channels.
Figure 8:
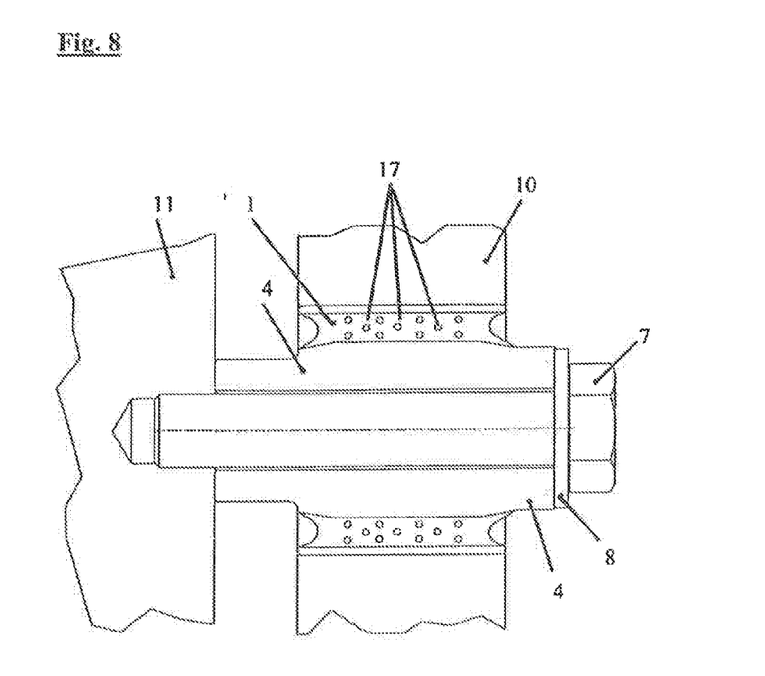
FIG. 8 show another embodiment of an elastomeric bushing with channels.

(8) Elastomer layer 1 is compressed in accordance with the invention, as described, by displacement of elastomer material out of pressing region 2. Alternatively or in addition to this compression, in particular if the displacement volume of the pressing regions should be insufficient due to design necessities, elastomer layer 1 can be compressed further by hydraulic pressure channels within elastomer layer 1 and the pretensioning of the bushing can thus be increased further. Pressure channels of this type in elastomer layers and the production thereof are described in WO 2009/121552. In this case, these are preferably hollow channels arranged in an annular manner in the rubber layer 1 of the bushing which can be expanded on supply of hydraulic or curable liquids from the outside and thus result in additional compression and tensioning (FIGS. 7 and 8).

(9) All systems and embodiments according to the invention which have been described are passive. However, active systems are also encompassed in accordance with the invention. In the case of active systems of this type, the inherent frequency can be modified during operation of plants by variation of the stiffness of the bushings according to the invention in a manner known per se. This is particularly advantageous in the case of machines having variable rotational speeds. Critical frequency ranges can thus be changed in operation so that they are no longer a nuisance.

(10) In the case of all the embodiments described, the elastomeric pressing region 2 may keep an additional volume ready for accommodation of the elastomer material from elastomer regions 1 and 2 in the case of a temperature increase. In general, elastic bushings have a temperature-dependent stiffness behaviour. With increasing temperature, the elastomer material becomes softer, causing the pretension to drop. This effect can be fully or partially compensated by allowing the elastomer to expand in the case of a temperature increase, increasing the pretension again. This can be accomplished in accordance with the invention by the provision of an additional volume. In the simplest case, the volume of pressing region 2, 25 is not completely filled with elastomer material at the normal operating temperature. In the case of an increase in the operating temperature, the elastomer material can expand from regions 1 and 2 into the available space. An alternative possibility consists in providing an additional expansion chamber which is connected to elastomer region 2 and/or 1. The invention thus relates to a corresponding elastomer bushing in which pressing region 2, 25 has an additional volume which is not occupied by elastomer material at a given temperature, but is partly or completely filled by the latter due to expansion in the case of a temperature increase.

(11) The bushings according to the invention are intended for use of bearings of machines, gearboxes and other industrial plants in which vibrations of a general type are to be damped. Bearings of this type equipped with the bushings according to the invention are particularly suitable for use in wind turbines. The invention thus also relates to bearings equipped with the bushings according to the invention and to the use thereof for reducing vibrations, in particular in wind turbines.

DESCRIPTION OF THE DRAWINGS

FIGS. 1, 1A and 6, 6A: show a bushing according to the invention in which pressing region 2 can be compressed on the inner part by means of a movable annular sleeve 3, which has been pushed onto one side of the inner part 4, and a stop 3a, and thus introduces pressure into the elastomer layer 1. The compression to be achieved here is determined by the selectable compression distance 9 between the inner part 4 and the pressure disc 8. The tensioning means used is a screw 7, which is screwed axially into the inner part 4. In this embodiment, the screw also serves to connect bearing parts 10 and 11. The left-hand part of FIG. 1 shows the outer wall of the outer sleeve 5 with a plurality of axially aligned slots 6 present in this case. The left-hand part of FIG. 6 shows the outer wall of the outer sleeve 5 with only one continuous slot 6 in this case.

FIG. 2: shows a further design in which both a part of the outer bushing 5 and also a part of the inner bushing 4 are moved axially by corresponding sliding means 3, 5a, 4a. The cross-section of the volume is thus the measurement between inner part/internal diameter and outer part/external diameter times the pretensioning compression distance. The pretensioning compression distance 9 can thus be significantly smaller for the same change in volume. Or conversely, a greater volume can be introduced for a small pretensioning distance. The pressing region 2 in this embodiment is the region below parts 4a, 5a, or 3 and extends as pretensioning ring over the entire thickness of elastomer layer 1, which is divided thereby into two halves. The tensioning takes place on one side via elements 7 and 8.

FIG. 3: shows a variant of the embodiment according to FIG. 2. However, the pressing region is additionally compressed by hydraulic means, which are introduced via a pressure supply line 12 in the bearing part 10. The hydraulic liquid, or optionally a curable liquid, acts directly on the elastomeric pressing region here through a corresponding opening in the outer sleeve 5 and compresses this region. The pressure supply line may be provided as individual holes/channels or alternatively also as a circumferential channel provided in the bearing part on the outer surface of the bushing and connected to the pressing region 2 through corresponding openings in the outer sleeve 5 at individual points or over the entire surface.

The bushing is thus completely divided axially in the middle, and pretensioning ring 2 serving as pressing region here is located between the bushing shells. This pretensioning ring is connected via line 12 either through the outer part 10 for filling through the valve 14. Alternatively, compression can also be effected through the pressure line 13 and the valve 14 in the inner part 4. The hydraulic system can be filled with a liquid which remains in the component. However, it may also be charged once with a curing elastomer filling.

Figure 4:
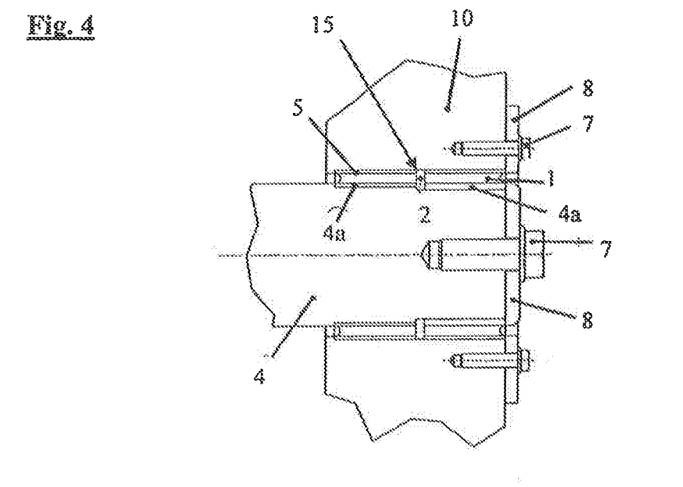
FIG. 4 shows a similar embodiment as depicted in FIG. 2.

FIG. 4A: shows a similar embodiment as depicted in FIG. 2. Here, the pressing region 2 in the form of a pretensioning ring can be compressed by part 5a and by the sliding sleeve 3.

FIG. 5: corresponds to FIG. 2. In addition, the tensioning does not take place on one side via one side of the bushing 16, but instead symmetrically from both faces of the bushing, i.e. also via the bearing part 11.

FIGS. 7 and 8: show an elastomeric bushing in which the pretensioning can be achieved via channels 17 in the interior of the elastomer layer 1 which can be expanded by hydraulic or curable liquids. These channels can be designed in an annular shape and in different diameters in the form of one or more rings alongside one another. Instead of the parallel rings, these may also be arranged in a spiral shape. The channels are filled via a valve, which leads to the outside.

FIG. 9: shows the principle of the embodiment of FIGS. 1, 1A. Here, however, the pressing region 2 is compressed by two opposite sliding sleeves 3, which are pushed over the inner part 4 from both sides of the bushing, by means of the tensioning means 7 and the pressure disc 8 in accordance with the adjustable compression distance 9.

FIGS. 10-10B and 13-13B: show an embodiment in which the elastomer-containing pressing region 2 is arranged in the interior of the inner part 4. This is connected to the circumferential elastomer layer 1 of the bushing via a plurality of elastomer-containing channels or holes 18. The holes are arranged radially and in a plane. They meet in the interior of part 4 in the elastomer-filled pressing chamber 2, which can be compressed by a cylindrical, axially movable piston element 19 by means of the tensioning screw 7.

Figure 10:
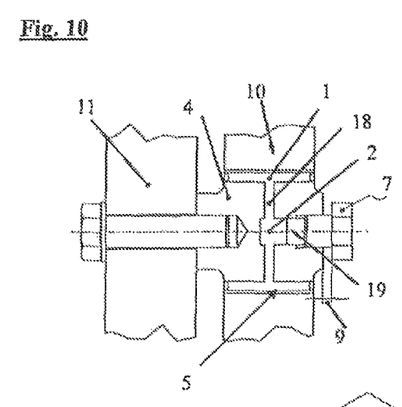
FIG. 10 is a sectional side view of an embodiment of a bushing with an inner elastomer-containing pressing region.
Figure 10A:
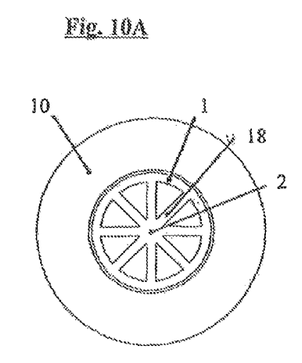
FIG. 10A is a diagrammatic front view of the embodiment of the bushing according to FIG. 10.
Figure 10B:
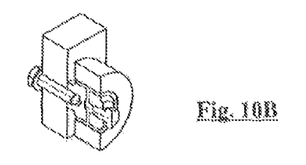
FIG. 10B is an isometric sectional view of the embodiment of the bushing according to FIG. 10.

FIGS. 11-11B: show a bushing according to the invention in which the pressing region 2 is, in contrast to FIGS. 10-10B, arranged outside the bushing 16 in the bearing element 10. The pressing region here has the shape of a continuous ring, which surrounds the bushing 16 directly or, as shown, at the distance of the diameter of the annular connecting channel 18, fully or in segments. The pressing region can be compressed by a ring piston 24 or alternatively by individual ring piston segments 24. The ring 18 is connected directly to the elastomer layer 1 in the interior of the bushing by a correspondingly shaped access in the outer sleeve 5.

Figure 12:
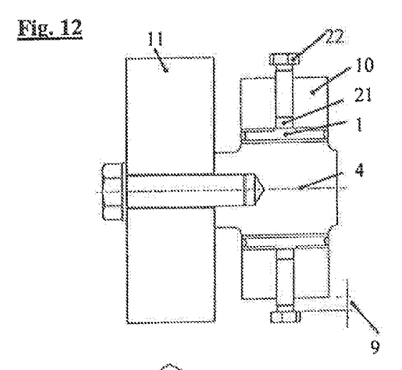
FIG. 12 is a sectional side view of an embodiment of a bushing with an outer sleeve having annular opening opposite the bearing part.
Figure 12A:
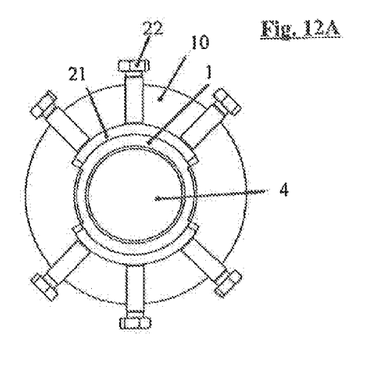
FIG. 12A is a diagrammatic front view of the embodiment of the bushing according to FIG. 12.
Figure 12B:
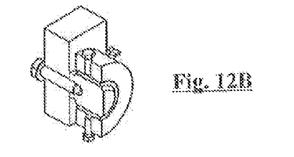
FIG. 12B is an isometric sectional view of the embodiment of the bushing according to FIG. 12.
Figure 13:
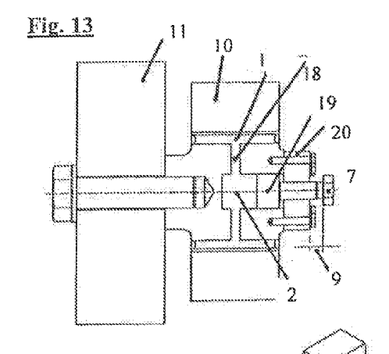
FIG. 13 is a sectional side view of an embodiment of a bushing with an inner elastomer-containing pressing region.
Figure 13A:
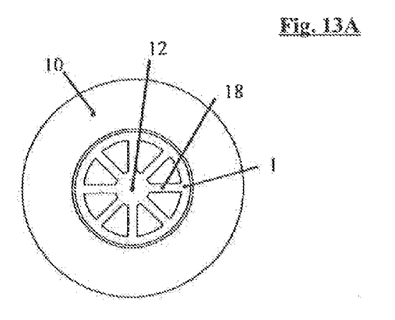
FIG. 13A is a diagrammatic front view of the embodiment of the bushing according to FIG. 13.
Figure 13B:
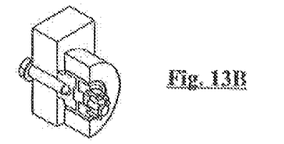
FIG. 13B is an isometric sectional view of the embodiment of the bushing according to FIG. 13.

FIGS. 12-12B: shows an embodiment according to the invention in which the outer sleeve 5 has a continuous or interrupted annular opening opposite the bearing part 10. A fitting ring or fitting ring segment 21 is placed in the bearing part at this point. The pressing region 2 here is essentially regarded as being the volume formed by the opening in the bushing. The ring or ring segments 21 are pressurized by radially arranged screws 22, which are guided in correspondingly aligned holes around the elastomer bushing, so that pressing region 2 can be compressed in the opening and the underlying elastomer region 1 in the bushing itself.

FIGS. 14-14B: show a similar embodiment according to the invention in accordance with FIGS. 12-12B. However, the pressing region 2 outside the bushing 16 in the bearing part 10 is formed here by individual separate holes or chambers 26, which are arranged in the axial direction around the bushing 16. Correspondingly, the pressing means used are cylindrical pistons 19, which can be forced into the pressing volume 2 by screws 7.

The reference numerals used are described in greater detail below:
1 Elastomer layer between the shells of the bushing 16
2 Pressing region filled with elastic material
3; 3' Sliding part
3a: Stop
4 Inner part (bolt)
4a Inner sleeve/movable part of inner part
5 Outer part/outer sleeve 5' Sliding part on outer sleeve 5
5a Movable part of outer sleeve
6 Slot in outer part
7 Pretensioning screw
8 Pretensioning disc
9 Compression distance
10 Bearing component (bushing side)
11 Bearing component (flange side)
12 Pressure line outer
13 Pressure line inner
14 Filling valve
15 Opening in outer part 5
17 Pressure channel
18 Rubber channel
19 Cylindrical piston
20 Plate
21 Piston ring or segment thereof
22 Radial screws for ring segment
23 Division of the outer part
24 Ring piston or segment thereof
25 Pressing region
26 Axial cylindrical hole

The invention claimed is:

1. A round elastomer bushing (16) which can be pretensioned and calibrated in an installed state, the bushing comprising:
a deformable outer sleeve (5) and a compact inner part (4) which can be flanged, the outer sleeve and the inner part are connected to one another by a first elastomer layer (1), and
a second elastomer layer (2, 25), being an elastomeric pressing region, is connected to the first elastomer layer (1) and is compressed by at least one of a mechanical compressing means (3, 4a, 5a, 8, 19, 21, 24; 12, 13, 7; 20, 21, 22) and a hydraulic compressing means (12, 13, 14, 17), such that elastomer material is forced out of the elastomeric pressing region (2) and pressed into the first elastomer layer (1) to compress the first elastomer layer (1) such that the outer sleeve (5) of the bushing is deformed radially outward to facilitate tensioning of the bushing (16) with a surrounding component (10) connected to the bushing.

2. The elastomer bushing according to claim 1, wherein the second elastomer layer (2), which functions as the elastomeric pressing region, occupies either all or some of a region of the first elastomer layer (1) between the outer sleeve (5) and the inner part (4).

3. The elastomer bushing according to claim 2, wherein the second elastomer layer (2), which functions as the elastomeric pressing region, is arranged at least one of:
internally on the outer sleeve (5), and
externally on either the inner part (4) or an inner sleeve (4a).

4. The elastomer bushing according to claim 3, wherein the mechanical compressing means is a sliding sleeve (3) which is moved axially inside the outer sleeve (5), by a tensioning means (7), over a compression distance (9) into the second elastomer layer (2).

5. The elastomer bushing according to claim 3, wherein the mechanical compressing means is a sliding sleeve (3) which partially surrounds the inner part (4) or the inner sleeve (4a) and is axially movable within the inner sleeve along a compression distance (9) into the second elastomer layer (2) by a tensioning means (7).

6. The elastomer bushing according to claim 2, wherein a wall of the outer sleeve (5) has, in a region of the second elastomer layer (2), at least one at least partially circumferential opening (15) which is filled with elastomer material, and the second elastomer layer represents the elastomeric pressing region (2).

7. The elastomer bushing according to claim 6, wherein the elastomeric pressing region (2) additionally encompasses an entire region behind the opening (15), between the wall of the outer sleeve (5) and the opposite inner part (4).

8. The elastomer bushing according to claim 6, wherein at least one of:
a portion of the wall of the outer sleeve (5), and
either the inner part (4) or the inner sleeve (4a), is axially movable by the at least one of the mechanical and the hydraulic compressing means in a direction of the elastomeric pressing region (2) to compress the elastomeric pressing region and the first elastomer layer (1).

9. The elastomer bushing according to claim 6, wherein the at least one at least partially circumferential openings (15) is connected to the at least one of the hydraulic and the mechanical compressing means (21, 22), by which pretension of the first elastomer layer (1) and the elastomeric pressing region (2) are adjustable and regulatable.

10. The elastomer bushing according to claim 1, wherein the inner part (4) is flanged and is surrounded by an inner sleeve (4a) of a same shape, the inner part (4) precisely fits in the inner sleeve, and is connected to the first elastomer layer (1) and the outer sleeve (5) of the elastomer bushing.

11. The elastomer bushing according to claim 1, wherein the second elastomer layer (2), which functions as the elastomeric pressing region, is arranged in an interior of the inner part (4), which has at least one radial hole (18) filled with the elastomeric material in a plane perpendicular to an axis of the bushing (16) which connects the elastomeric pressing region (2) to the first elastomer layer (1).

12. The elastomer bushing according to claim 11, wherein the inner part (4) comprises at least two radial holes (18), and the at least one of the mechanical and the hydraulic compressing means comprises a piston (19) and a tensioning screw (7), each of the piston and the tensioning screw is arranged centrally and axially within the inner part (4) and, when moved axially in a direction of the elastomeric pressing region (2), the piston and the tensioning screw either compresses or decompresses the elastomer material located in the elastomeric pressing region and, via the radial holes (18), also the first elastomer layer (1) of the bushing (16), which causes tensioning of the bushing against the surrounding component (10).

13. The elastomer bushing according to claim 1, wherein the elastomeric pressing region (25, 26) is arranged outside the bushing (16), in the surrounding component (10) to be tensioned by the bushing, the elastomeric pressing region is connected to the first elastomer layer (1) in an interior of the bushing by at least one channel (18) that contains the elastomer material and a correspondingly shaped opening in a wall of the outer sleeve (5) and is either compressed or decompressed by the at least one of the mechanical and the hydraulic compressing means (7, 19, 20, 24), which are arranged on at least one of the inner part (4) and the surrounding component (10).

14. The elastomer bushing according to claim 13, wherein the elastomeric pressing region (25) surrounds the bushing (16) radially either in full or in segments, and the at least one of the mechanical and the hydraulic compressing means is arranged in a same manner as the elastomeric pressing region and comprises either a ring piston (24) or a segment of a ring piston, which is forced into the elastomeric pressing region (25) by the at least one of the mechanical and the hydraulic compressing means (7).

15. The elastomer bushing according to claim 13, wherein the elastomeric pressing region (25) in the surrounding component (10) is formed by at least two axially arranged holes (26) in the surrounding component (10), which are equipped with piston-shaped pressing means (19) and tensioning means (7), the holes are arranged around the bushing (16), the piston-shaped pressing means (19) being axially movable within the holes.

16. The elastomer bushing according to claim 1, wherein the outer sleeve (5) of the bushing has at least one longitudinal slot (6).

17. The elastomer bushing according to claim 1, wherein the first elastomer layer (1) has at least one radially circumferential pressure channel, which is expandable by hydraulic means, to facilitate regulating a bushing stiffness in a variable manner.

18. The elastomer bushing according to claim 1, wherein an elastomer material which forms the first elastomer layer (1) and the elastomeric material from the second elastomer layer (2, 25) have different stiffness.

19. The elastomer bushing according to claim 1, wherein the mechanical compressing means (7, 22) are active actuators, and thus enable a specific change in the stiffness during operation.

20. The elastomer bushing according to claim 1, wherein the elastomeric pressing region (2, 25) has an additional elastomer-free volume which is at least partially filled by expansion of elastomer material which expands due to a temperature increase as a consequence of operation.

\* \* \* \* \*